United States Patent [19]

Yamamoto

[11] Patent Number: 4,931,714
[45] Date of Patent: Jun. 5, 1990

[54] DEVICE FOR LIFTING UP AND DOWN WINDOW GLASS FOR VEHICLE

[75] Inventor: Harushige Yamamoto, Tokyo, Japan

[73] Assignee: Niles Parts Co., Ltd., Tokyo, Japan

[21] Appl. No.: 245,670

[22] Filed: Sep. 16, 1988

[51] Int. Cl.$^5$ ............................................. G05B 11/18
[52] U.S. Cl. .................................. 318/663; 318/265; 318/286; 318/467; 318/652
[58] Field of Search ............... 318/264, 265, 266, 286, 318/466, 467, 468, 663, 652, 666, 670

[56] References Cited

U.S. PATENT DOCUMENTS

| | | | |
|---|---|---|---|
| 4,263,539 | 4/1981 | Barton | 318/663 X |
| 4,328,451 | 5/1982 | Barge | 318/663 X |
| 4,408,146 | 10/1983 | Beckerman | 318/264 |
| 4,549,125 | 10/1985 | Sonobe | 318/663 |
| 4,556,835 | 12/1985 | Vogel et al. | 318/663 |
| 4,712,053 | 12/1987 | Numata | 318/663 |
| 4,785,224 | 11/1988 | Pfalzgraf et al. | 318/663 |

FOREIGN PATENT DOCUMENTS

| | | | |
|---|---|---|---|
| 2812306 | 10/1979 | Fed. Rep. of Germany | 318/663 |
| 2425105 | 1/1980 | France | 318/663 |
| 51-132533 | 11/1976 | Japan | |
| 58-33706 | 2/1983 | Japan | 318/663 |
| 1270745 | 11/1986 | U.S.S.R. | 318/663 |

OTHER PUBLICATIONS

"Simple Position Servo", Practical Electronics, Mar. 1977, p. 218.

Primary Examiner—Bentsu Ro
Attorney, Agent, or Firm—Ronald P. Kananen

[57] ABSTRACT

According to the present invention, there is provided a device for lifting up and down window glass for a vehicle including a reversible motor for lifting up and down window glass of a vehicle, a drive circuit connected to an input side of the reversible motor, a comparison circuit and/or a control circuit connected to an input side of the drive circuit, a window glass opening degree determination mechanism connected to an input side of the control circuit so as to produce either reference voltage or comparison voltage, a window glass opening degree detector connected to a comparison input of the comparison circuit so as to produce either reference voltage or comparison voltage in accordance with window glass opening degree. The device of the present invention is particularly characterized by the control circuit including a locking detector which outputs a signal as the output signal of the window opening degree detector exceeds a predetermined value when the window glass is moved in abnormal manner, and therefore it offers excellent serviceability and safety, namely it can protect a baby in the vehicle from an accident.

4 Claims, 3 Drawing Sheets

DEVICE FOR LIFTING UP AND DOWN WINDOW GLASS FOR VEHICLE

BACKGROUND OF THE INVENTION

1. Field of the Invention

The present invention relates to an improvement of a device for lifting up and down window glass for a vehicle. More particularly, this invention is concerned with a device for lifting up and down the window glass for the vehicle which is excellent in terms of serviceability and safety.

2. Background Art

One of the window lifting devices which has been known is disclosed in Japanese Patent Application Laid Open No. 51-132533 (132533/1976).

In this proposal, the window glass is lifted up and down all the way at the touch of a switch. As a one-touch switch is operated, a window drive motor rotates for a predetermined period of time, thereby lifting the window glass up and down. In an apparatus having another construction, on the other hand, the operation switch is directly connected to the window drive motor and the window is lifted up and down by so-called manual operation by keeping the operation switch pushed for a predetermined period of time.

As shown in FIG. 1, the switch 100 of the conventional type is disposed in an arm rest section 103 together with other switches, e.g., a door lock switch 101 for the driver side and a door switch 102 for the other side. On the operation plate of the switch 100, lifting directions are indicated by characters such as "UP" and "DOWN".

The above-mentioned conventional devices have the following drawbacks.

The device which lifts up and down the window glass by manipulating the one-touch switch is convenient when the driver receives a ticket and pays a toll at the entrance and the exit of a toll road although unpleasantness is unavoidable during cold weather or when the weather is bad since the window glass is fully opened. Under such a circumstance, it is desired that the driver can stop the window glass at a position he wants so that he may receive the toll ticket while the window is opened only part way.

The apparatus which opens the window glass by manual operation of the switch overcomes the problem the former apparatus has, i.e., it can stop the window glass at any position the driver or other passengers want. However, the switch manipulator on the car has to keep pressing the switch until the window glass reaches a position he wants. Accordingly, as for the driver, he tends to pay less attention to driving since part of his attention goes to the window. Therefore, both apparatuses have opposite shortcomings and advantages.

Furthermore, the switch 100 of the former case as illustrated in FIG. 1 is generally disposed within the arm rest portion 103 together with other switches such as a door lock switch 101 for the driver side or a door switch 102 for the other side. Thus, the driver might touch another switch as he gropes for the window switch, and even if the moving directions of the window glass are indicated by words such as "UP" and "DOWN", the moving direction of the switch 100 is not identical to the moving direction of the window glass, so that operation of such a switch is not always easy. In addition, when a young child plays on the arm rest 103 with his head out of the car, he might have his neck squeezed by stepping on the switch 100.

Moreover, when a part of someone's body is caught in the window, the danger will not be eliminated by merely stopping the reversible motor for the window at that situation.

SUMMARY OF THE INVENTION

The present invention is developed with regard to the aforementioned problems. According to a first aspect of the present invention, there is provided a window lifting up and down device for a vehicle characterized by including a reversible motor for lifting the vehicle window glass up and down, drive circuit means connected to the input of said reversible motor, comparison circuit means connected to the input of said drive circuit means, window glass opening degree determination means connected to the reference input side of said comparison circuit means so as to produce either a reference voltage or a comparison voltage, and window glass opening degree detection means connected to the comparison input of said comparison circuit means so as to produce either a reference voltage or a comparison voltage in accordance with window glass opening degree, said window glass opening degree determination means including a slide rheostat, the operation direction of the slide rheostat being essentially the same as a moving direction of the window glass, said window glass opening degree determination means further including click stop portions at positions corresponding to the uppermost and lowermost positions as well as intermediate positions of the lifting, and an operation section of said window opening determination means being located at a place so that it may not protrude from the interior wall of the vehicle.

According to a second aspect of the present invention, there is provided a vehicle window glass lifting up and down device having a reversible motor for lifting the vehicle window glass, drive circuit means connected to the input side of said reversible motor, control circuit means connected to the input side of said drive circuit means, window glass opening degree detection means connected to the input of said control circuit so as to produce voltage on the basis of the window glass opening degree, characterized in that said control circuit includes locking detection means for outputting a signal when an output signal of said window glass opening degree detection means exceeds a predetermined value during abnormal operation of the window glass, wherein said control circuit means includes reverse circuit means for biasing energy to said reversible motor for a predetermined period of time so as to open the window glass upon an output signal of said locking detection means, and said control circuit means includes closing-position-reversing prevention circuit means for outputting an inhibiting signal to said reverse circuit means when the output voltage from said window glass opening degree detection means exceeds a level corresponding to a closing position of the window.

Opening of the window, for example, at an express-highway toll gate by a device of the present invention having the aforementioned construction will be described.

First, the passenger lowers an operation part of the window opening degree determination means in order to lower the window. The window is stopped halfway by watching the movement of the window or by groping for the position-telling click stop portion provided to the window glass opening degree determination means. Then, a reference voltage corresponding to a position determined by the window glass opening degree determination means is input to the reference input of the comparison circuit means. On the other hand, a comparison voltage based on window glass opening degree is input to the comparison input of the comparison circuit means, and the comparison circuit means keeps outputting signals to the drive circuit means thereby driving the reversible motor until the reference voltage and the comparison voltage become equal to each other.

When the reversible motor is operated for closing of the window via the drive circuit means by operating the control circuit means, the window glass opening degree detection means inputs a voltage based on a degree of window glass opening.

The comparison voltage from the window glass opening degree detection means, that is an output voltage thereof, varies with window glass opening degree as described above. This means that the output voltage varies at a constant rate when no resistance and external force are applied to the window glass and the window glass moves smoothly while said output voltage decreases or becomes constant when a part of a body, for instance, of a baby is caught in the window and braking effort is exerted on the window glass.

As the output voltage of the window glass opening degree detection means drops to or under a predetermined level, the locking detection means outputs a signal, and the reverse circuit means biases energy to the reversible motor for a predetermined period of time for opening a window glass upon the output signal from the locking detection means. In other words, because of such function, the window glass is stopped midway when a part of the body, for example, of a baby is caught in the window during an upward movement of the window glass.

It should be also noted that even when the window glass completely reaches the closing position, the resistance is applied to the reversible motor and the output voltage of the window glass opening degree detection means drops. At this point, if the aforementioned reverse circuit means starts functioning, the window glass cannot be closed completely forever. Therefore, according to the present invention, there is provided a closing-position-reversing prevention circuit means as a measure against such a drawback. Thus, the closing-position-reversing prevention circuit means may output an inhibiting signal to said reverse circuit means when the output voltage from said window glass opening degree detection means exceeds a level corresponding to a full closing position of the window glass, thereby preventing the reversing at the window glass full closing position.

DESCRIPTION OF THE PREFERRED EMBODIMENTS

Preferred embodiments of the present invention will be described with reference to FIGS. 2 through 6 of the accompanying drawings.

Figure 2:
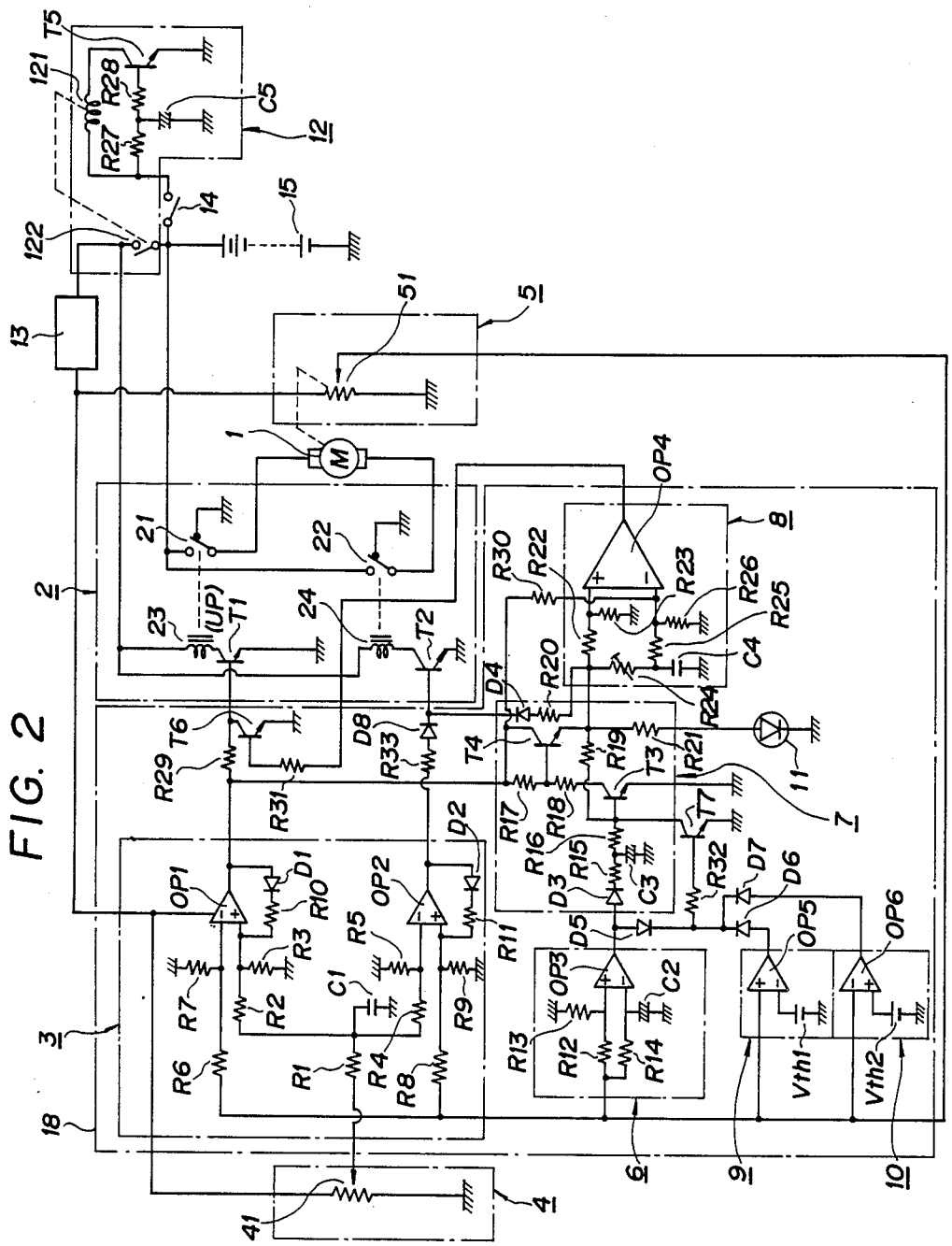
FIG. 2 is an electric circuit diagram showing a preferred embodiment according to the present invention.

In FIG. 2, a circuit according to the invention includes a reversible motor 1, an amplifier circuit 2 as a drive circuit means, a comparison circuit 3 as a comparison circuit means, a slide rheostat 4 as a window glass opening degree determination means, a potentiometer 5 as a window glass opening detection means, a locking detection circuit 6 as locking detection circuit means, a reverse circuit 7 and a reversing stopping circuit 8 respectively as a reverse circuit means, a closing position reversing prevention circuit 9 as a closing position reversing prevention circuit means, a release circuit 10, a locking indication section 11, a timer circuit 12, a constant voltage circuit 13, an ignition switch 14, and a power source 15. The comparison circuit 3, the locking detection circuit 6, the reverse circuit 7, the reversing stopping circuit 8, the closing position reversing prevention circuit 9, and the release circuit 10 constitute in combination 9 control circuit means 18.

More specifically, the reversible motor 1 is connected to a gear (not shown) for lifting up and down the window glass of a vehicle.

The amplifier circuit 2 is connected between two terminals of the reversible motor 1, and includes an UP relay contact point 21 for electrical connection for window glass lifting, a DOWN relay contact point 22 for electrical connection for window glass lowering, a coil 23 of said UP relay, a coil 24 of said DOWN relay, and transistors $T_1$ and $T_2$ respectively connected to said relay coil 23 and 24.

The comparison circuit 3 is connected to an input of the amplifier 2, and compares a reference voltage determined by the slide rheostat 4 with a comparison voltage produced by the potentiometer 5 so as to send a signal to the amplifier circuit 2. The comparison circuit 3 is constituted by first and second operational amplifiers $OP_1$ and $OP_2$, resistances $R_1$ through $R_5$ for potentially dividing an input voltage from the slide rheostat 4, a noise absorbing capacitor $C_1$, resistances $R_6$ through $R_9$ for potentially dividing an input voltage from the potentiometer 5, feedback resistances $R_{10}$ and $R_{11}$, and diodes $D_1$ and $D_2$. The output of the first operational amplifier $OP_1$ is connected to the reverse circuit 7 which is described later.

Figure 1:
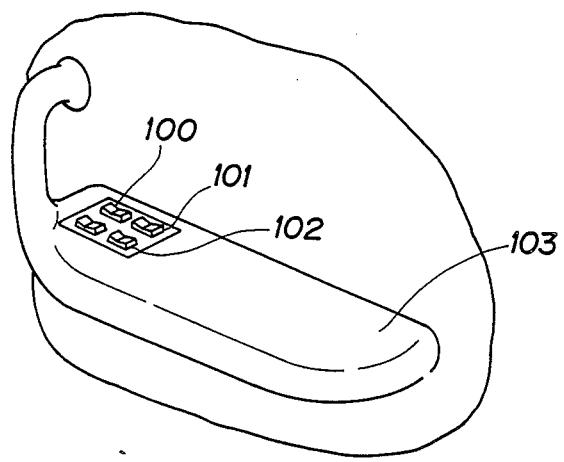
FIG. 1 is a perspective view showing a prior art.
Figure 3:
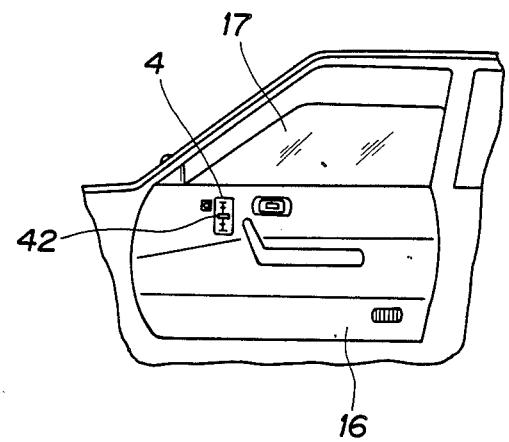
FIG. 3 is a view to explain of installation of a slide rheostat of the present invention.
Figure 4:
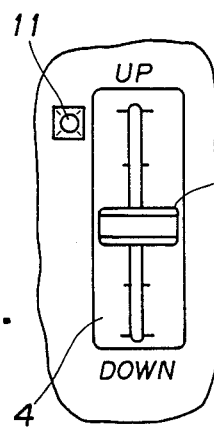
FIG. 4 is a front view of the slide rheostat of the present invention.
Figure 5:
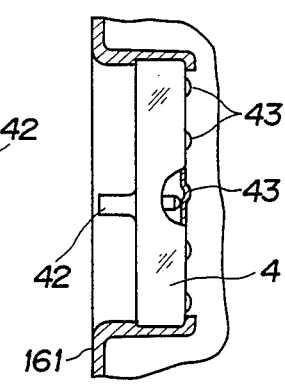
FIG. 5 is a side view of a partial section of FIG. 4 according to the present invention.
Figure 6:
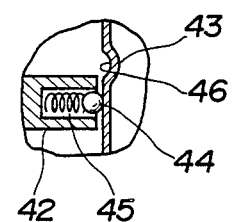
FIG. 6 is a detailed view enlarging an essential part of FIG. 5 of the present invention.

The slide rheostat 4 is connected to the constant voltage circuit 13 at one end, and the output of the sliding contact 41 is connected to the comparison circuit 3. The slide rheostat 4 is, for example, disposed inside the driver side door 16, and a moving direction of a knob 42 is essentially the same as the moving direction of the window glass 17, as illustrated in FIG. 3. As illustrated in FIGS. 4 and 5, the knob 42 is disposed so as not to protrude from the inner wall 161 of the door 16, and the slide rheostat 4 has position-telling click stop portions 43 for giving an operator a feeling of a click stop at both ends of lifting and between the ends. Referring to FIG. 6, the position telling portions 43 includes a steel ball 44 and a coil spring 45 housing in the knob 42, and grooves 46 for engaging the steel ball 44.

The potentiometer 5 is connected to the constant voltage circuit 13 at one end with the output of the sliding contact 51 thereof being connected to the comparison circuit 3, and also connected to the drive gear, and so forth so as to produce an output proportional to the lifting position of the window glass 17.

Figure 7:
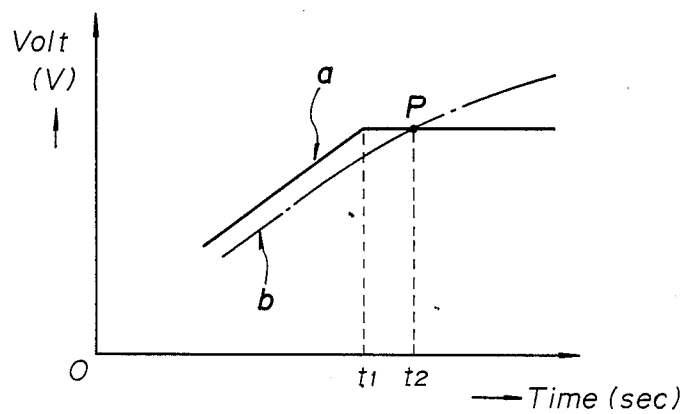
FIG. 7 is an electric characteristic diagram of a locking detection circuit illustrated in FIG. 2 according to the present invention.

The locking detection circuit 6 is a circuit which generates an output when the window glass 17 is inhibited from moving upward during its upward movement, and consists of a third operational amplifier $OP_3$, potential dividing resistors $R_{12}$ and $R_{13}$, an integrating resistor $R_{14}$, and an integrating capacitor $C_2$. Operation of the locking detection circuit 6 will be described in depth with reference to the characteristic curves depicted in FIG. 7. The characteristic curves of FIG. 7 show a change of voltage produced at the input of the third operational amplifier $OP_3$ during upward motion of the window glass 17 by manipulating the slide rheostat to an UP side, in which a solid line a indicates voltage change at a non-inverted input (a plus terminal) of the third operational amplifier $OP_3$, and a dashed line b indicates a voltage change at an inverted input (a minus terminal) of the same. As long as the window glass 17 moves upward normally, the solid line a is kept higher than the dashed line b, so that the output of the third operational amplifier $OP_3$ is at a higher level. However, when an external force is applied to the window glass 17 at a time of $t_1$ in (seconds), the potentiometer 5 stops, and the solid line a stops changing its level. After that, the dashed line b exceeds the solid line a at a time of $t_2$ in (seconds) as indicated by a point P, whereby the output of the third operational amplifier $OP_3$ becomes a lower voltage so as to produce an output.

The reverse circuit 7 is a circuit which holds itself, as the output of said locking detection circuit 6 turns from higher level to lower level, so as to excite the DOWN relay coil 24 and output a signal to the reversing prevention circuit 8 and the locking indication section 11, and includes a diode $D_3$, resistance $R_{15}$, $R_{16}$ and a capacitor $C_3$ as a charge and discharge circuit, transistors $T_3$ and $T_4$, resistances $R_{17}$ through $R_{19}$ as a self-holding circuit, an output resistance $R_{20}$ and a diode $D_4$ which are connected to a transister $T_2$, and a resistance $R_{21}$ connected to the locking indication section 11.

The reversing prevention circuit 8 is a circuit which outputs a higher voltage signal for a predetermined time upon the output from said reverse circuit 7, and includes a fourth operational amplifier $OP_4$, non-inverted input side potential dividing resistance $R_{22}$ and $R_{23}$, inverted input side potential dividing and integrating resistance $R_{24}$ through $R_{26}$, and an integrating capacitor $C_4$.

The closing position reversing prevention circuit 9 is a circuit which inhibits the movement of the side reverse circuit 7 when the window glass 17 reaches the full closed position, and includes a fifth operational amplifier $OP_5$ and a first reference voltage section $V_{th1}$ connected to the inverting input of the fifth operational amplifier $OP_5$.

The release circuit 10 is a circuit which releases self-holding of the reverse circuit 7, and includes a sixth operational amplifier $OP_6$ and a second reference voltage section $V_{th2}$ connected to the non-inverted input of the sixth operational amplifier $OP_6$.

The locking indication section 11 is composed of light emitting diodes (LED) and is disposed near the slide rheostat 4 as depicted in FIG. 3.

The timer circuit 12 is a circuit which maintains a supply of electric power to the device for a predetermined period of time upon turning off the ingition switch 14, and composed of resistances $R_{27}$ and $R_{28}$, a capacitor $C_5$, a transistor $T_5$, a relay exciting coil 121, and is a relay contact point 122.

The resistance $R_{29}$ is disposed between the output of said first operational amplifier $OP_1$ and the base of the transistor $T_1$, a resistance $R_{30}$ is disposed between the output of the first operational amplifier $OP_1$ and the inverted input of the fourth operational amplifier $OP_4$, and a resistance $R_{31}$ and a transistor $T_6$ are disposed between the output of the fourth operational amplifier $OP_4$ and the base of the transistor $T_1$. The collector of said transistor $T_6$ is connected to the base of the transistor $T_1$, the emitter of the same is connected to the earth, and the base of the same is to the resistance $R_{31}$.

The output of the third operational amplifier $OP_3$ is connected to the base of the transistor $T_3$ via the diode $D_5$, the resistance $R_{32}$, and the base of the transistor $T_7$, the collector of the transistor $T_7$, and the junction of said resistance $R_{32}$ and the diode $D_5$ is connected to the output of the fifth operational amplifier $OP_5$ via the diode $D_6$ and to the output of the sixth operational amplifier $OP_6$ via the diode $D_7$. The output of the second operational amplifier $OP_2$ is connected to the base of the transistor $T_2$ via the resistance $R_{33}$ and the diode $D_8$.

Now, the functioning of the preferred embodiment of the present invention having the above-described construction will be described.

(1) Opening the window glass

As the knob 42 of the slide rheostat 4 is lowered toward "DOWN", the output of the first operational amplifier $OP_1$ becomes low while the output of the second operational amplifier $OP_2$ becomes high, whereby the UP relay 23 is turned off while the DOWN relay 24 is turned on. Therefore, the motor 1 is supplied with electric power so as to move the window glass 17 downward. As the window glass 17 moves downward, the potentiometer 5 is activated, and the potential of the non-inverted input of the second operational amplifier $OP_2$ drops. When the potential becomes lower than the inverted side potential, the output of the second operational amplifier $OP_2$ is inverted from a high potential to a low potential, thereby turning off the DOWN relay 24 and deactivating the motor 1. At this time, if the slide rheostat 4 is set at an intermediate position, the output of said the second operational amplifier $OP_2$ is changed to a low potential so as to stop the window glass 17 when the window glass 17 reaches the intermediate position.

(2) Closing window glass

As the knob 42 of the slide rheostat 4 is moved up toward "UP", the output of the first operational amplifier $OP_1$ becomes a high potential while the same of the second operational amplifier $OP_2$ becomes a low potential, turning on the UP relay 23 and turning off the DOWN relay 24, so that electric power is supplied to the motor 1 so as to move the window glass 17 upward. Therefore, the window glass 17 is shut as described above.

(3) Locking

While the window glass is being shut, the output of the third operational amplifier $OP_3$ is turned from a high potential to a low potential when a part of a body of a passenger or the like is caught in the window and the motor 1 is forcedly stopped, and then the transistor $T_7$ is turned off and electric charge of the capacitor $C_3$ flows to the base of the transistor $T_3$, so that the transistor $T_3$ is turned on, forming the holding circuit with the transistor $T_4$.

As the transistor $T_4$ is turned on, the locking indication section 11 is lighted, and the transistor $T_2$ is turned on, exciting the DOWN relay 24. The reversing prevention circuit 8 starts charging the capacitor $C_4$ as the transistor $T_4$ is turned on, and the output of the fourth operational amplifier $OP_4$ is kept at a high potential, turning on the transistor $T_6$ while turning off the transistor $T_1$ until a predetermined amount of charging. After that, when the charging of the capacitor $C_4$ is finished, the output of the fourth operational amplifier $OP_4$ becomes low potential. Accordingly, when the holding circuit is formed by the transistors $T_3$ and $T_4$ due to locking of the reversible motor 1, the reversible motor 1 is reversed to the lowering side and stopped during a predetermined period of time, namely while the capacitor $C_4$ is being charged.

(4) Releasing locking

In order to release locking, the knob 42 of the slide rheostat 4 may be moved downward. More specifically, when the knob is lowered so that the position of the slide rheostat 4 corresponds to the reversing prevention position of the window glass 17 upon locking may be moved. The output of the first operational amplifier $OP_1$ is changed from high potential to low potential, whereby supply of the electric power to the transistors $T_3$ and $T_4$ is cut, releasing locking. Releasing of locking is performed by the release circuit 10. When said reversing prevention position is the lowermost position, the knob 42 cannot be lowered any more. It lacks serviceability to turn off the ignition switch 14 once in order to release locking.

According to the present invention, when the window glass 17 is positioned near the lowermost position, the inverted input voltage of the sixth operational amplifier $OP_6$ becomes equal to or lower than non-inverted input voltage given by the second reference voltage section $V_{th2}$ because of the release circuit 10 changing the output of the sixth operational amplifier $OP_6$ to high potential. This turns on the transistor $T_7$, while turning off the transistor $T_3$, thereby automatically releasing locking.

(5) At full closing of window

As the knob 42 of the slide rheostat 4 is shifted to uppermost position of UP side, the window moves upward. However, on the way to the uppermost position, if resistance force is applied to the reversible motor 1 by rubber frame of the window or like, it is not possible to fully close the window glass since the motor is reversed to lowering mode due to aforementioned locking operation.

According to the present invention, in order to eliminate the above-mentioned drawback, there is provided the closing position reversing prevention circuit 9 so that the uninvertible input of the fifth operational amplifier $OP_5$ may be set beforehand to be equal to or higher than the inverted input voltage given by the first reference voltage section $V_{th1}$ at a position just before the full closed position of the window. The high potential output of the fifth operational amplifier $OP_5$ causes the transistor $T_7$ to be turned on, preventing the transistor $T_3$ from functioning and the reversible motor 1 from being reversed.

It is recognized, of course, that the present invention is not limited to the above-described embodiment. For example, the device for lifting up and down the window glass of the present invention may be applied to a vehicle other than an automobile, such as a tram car. The window glass opening degree detection means and the window glass opening degree determination means may employ optical means, and position-telling click stop portins may not be formed at uppermost and lowermost positions of lifting. Accordingly, it is to be understood that the protection sought and to be afforded hereby should be deemed to extend to the subject matter claimed and all equivalents thereof fairly within the scope of the invention.

The present invention has following advantages.

(1) A passenger does not have to keep pressing the switch till the window glass reaches the designated position, and the window glass may be stopped at any position.

(2) Therefore, as to the driver, he does not have to pay much attention to manipulation of the switch and confirmation of the window glasss position, allowing him to concentrate on driving.

(3) The manipulation direction of the window opening degree determination means is essentially the same as the moving direction of the window glass, which is excellent in view of human engineering.

(4) Since the control section of the window glass opening degree determination means is disposed at a position so that it may not protrude from the interior wall of the cabin, there is little possibility of mismanipulation of the switch.

(5) When something, for instance a part of a body of a baby, is caught in the window, the reversible motor is reversed, preventing a baby from getting hurt and lessening pain felt.

(6) The closing reversing prevention means prevents the reversible motor from reversing as the window glass approaches the full closing position even if braking force is applied thereto, whereby the window glass may reach the full closing position.

(7) In short, as mentioned above the present invention is excellent in terms of serviceability as well as safety.

What is claimed is:

1. A device for lifting up and down window glass for vehicle comprising;

a reversible motor for lifting up and down window glass of a vehicle;

drive circuit means connected to an input side of said reversible motor;

control circuit means connected to an input side of said drive circuit means; and window glass opening degree detection means connected to an input side of said control circuit means so as to output voltage in accordance with window glass opening degree, said control circuit means includes locking detection means which outputs a signal when the output voltage of said window glass opening degree detection means exceeds a predetermined value during the window glass moves in abnormal manner; and said control circuit means further includes reversing circuit means which biases energy to said reversible motor for a predetermined period of time so as to open the window glass upon receiving the output signal from said locking detection means; and said control circuit means still further includes a release circuit means for outputting a signal to release the operation of said reversing circuit means, when the output signal of said window glass opening degree detection means becomes below a predetermined value upon reaching of the window glass at the near portion of the lowermost position thereof.

2. A device for lifting up and down window glass of claim 1, wherein said window glass opening degree detection means includes click stop sections at positions corresponding to upper and lowermost positions of lifting as well as intermediate points therebetween.

3. A device for lifting up and down window glass of claim 1 wherein said window glass opening degree detection means is disposed at a position so that it may not protrude from an interior wall of the cabin.

4. A device for lifting up and down window glass of claim 1, wherein said control circuit means includes closing position reversing prevention means which outputs a prevention signal to said reversing circuit means as the output voltage from said window glass opening degree detection means exceeds a level corresponding to a closing position of the window glass.

* * * * *